United States Patent [19]

Hino et al.

[11] Patent Number: 4,818,927
[45] Date of Patent: Apr. 4, 1989

[54] ACCELERATION/DECELERATION CONTROL APPARATUS USING SLIP SPEED

[75] Inventors: Kiyoshi Hino; Kousuke Kaitou; Kiyokazu Okamoto, all of Tokyo, Japan

[73] Assignees: Nippon Electric Industry Co., Ltd.; NEC Corporation, both of Tokyo, Japan

[21] Appl. No.: 36,056

[22] Filed: Apr. 9, 1987

[30] Foreign Application Priority Data

Apr. 11, 1986 [JP] Japan .................................. 61-83847

[51] Int. Cl.$^4$ .............................................. H02P 5/40
[52] U.S. Cl. ..................................... 318/798; 318/806; 318/807
[58] Field of Search ................ 318/798, 806, 800–803, 318/807–811

[56] References Cited

U.S. PATENT DOCUMENTS 4,483,419 11/1984 Salihi et al. ......................... 318/759

Primary Examiner—David Smith, Jr.
Attorney, Agent, or Firm—Jordan and Hamburg

[57] ABSTRACT

The acceleration/deceleration control apparatus using slip speed detects an angular frequency ωr corresponding to an execution speed of an induction motor and derives an angular frequency ωs corresponding to a slip speed corresponding to a slip speed in response to a torque of the said motor, from a vector controller of the said motor.

On the other hand, an allowable value ωs′ of said angular frequency corresponding to the said ωr is prepared beforehand, and is compared with said angular frequency ωs.

According to the result of this comparison, the IM rotation is controlled. So even if the induction motor is used as servo motor, no shock of the torque will flow through the motor and the motor itself will not be stalled.

3 Claims, 10 Drawing Sheets

F I G. 10
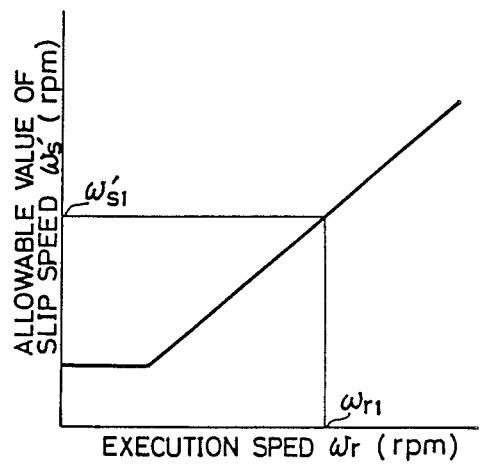

ACCELERATION/DECELERATION CONTROL APPARATUS USING SLIP SPEED

BACKGROUND OF THE INVENTION

1. Field of the Invention

The present invention relates to an acceleration/deceleration control apparatus using a slip speed, and more particularly to an acceleration/deceleration control apparatus using a slip speed, for use in an induction motor to limit any excessively abrupt acceleration/deceleration of the induction motor.

2. Description of the Prior-art

Heretofore, the induction motor (will be referred to as "IM" hereinafter) has been widely utilized as a constant-speed motor with a power source of a predetermined frequency since it is sturdy and not expensive.

However, such IM has not been used as a servo motor for which a rapid acceleration/deceleration is required.

Recently, however, vector control of the IM has been industrially implemented, while the IM itself has been improved. Thus, the IM has a possibility of use as a servo motor. That is to say, since a power source of widely variable frequency has become available for driving the IM as a result of the recent technological innovation in the fields of the electronic devices, microcomputers, and software, the IM is being changed from the constant-speed motor to a servo motor.

Conventional vector control of slip frequency type will be explained herebelow with reference to FIG. 11.

FIG. 11 shows a basic concept of the slip-frequency type vector controller which comprises a speed control amplifier 101 to amplify the difference between a command speed $\omega r^*$ and actual speed $\omega r$, a divider 102, a constantsetter 103, a vector analyzer 104 to synthesize a torque current component and exciting current component, a adder 105 to synthesize a vector based on the output of a vector generator which will be described later and the output from the vector analyzer, a converter 106 to convert the adder output into a three-phase current signal, a current control amplifier 107 to amplify the difference between the commanded current value and actual current value, a power for supply to the IM, an induction motor (IM) 109, a three-phase power source 110, a speed detector 111, a differentiator 112, constant setters 113, 114, 115 and 116, a divider 117, an vector generator 118 to determine a speed of rotating field to be given to the IM, and an adder 119. An output of the amplifier 101 represents the torque of the IM.

With such arrangement, it is possible to control the torque (which represents a rotating force of the IM) according to the change of momentary current which varies moment by moment, based on the well-known vector controller.

Even with a slip-frequency type vector controller 100 having the basic concept shown in FIG. 11, if it is used as it is as a servo motor, an excessively abrupt acceleration/deceleration occurs so that an overslip will occur in the IM. Also even with increased primary current through the IM, a stalled condition may occur in which the torque does not increase.

SUMMARY OF THE INVENTION

Accordingly, the present invention has an object to prevent any shock of the torque caused by an excessively abrupt acceleration/deceleration and also any stalled condition from taking place even when the IM is used as an servo motor, by providing an acceleration/deceleration control apparatus using the slip speed.

The above object can be accomplished by providing an acceleration/deceleration control apparatus using a slip speed comprising, according to the present invention, a means for detecting an angular frequency $\omega r$ corresponding to an execution speed of the induction motor under the control of the apparatus according to the invention, a means for calculating, in response to the torque of the said IM, an angular frequency $\omega s$ corresponding to a slip speed derived from the vector controller, and a means for comparing an allowable value $\omega s'$ of the angular frequency $\omega s$ with the calculated angular frequency $\omega s$, whereby if the output of the comparing means is the allowable value $\omega s' \geq$ angular frequency $\omega s$, the control having so far been done is continued, and if the output is the allowable value $\omega s' <$ angular frequency $\omega s$, the change of commanded position of the induction motor is so inhibited that the angular frequency $\omega s$ is less than the allowable value $\omega s$, thus preventing any excessively abrupt acceleration/deceleration of the induction motor.

Therefore, since the actual slip speed of IM is so controlled as to be within a preset allowable value of rotating speed, no shock of IM torque will flow and the induction motor will not stall.

These and other objects and advantages of the present invention will be better understood from the ensuing description made by way of example of the embodiments according to the present invention with reference to the drawings. The values $\omega s$, $\omega s'$ and $\omega r$ are absolute values.

BRIEF DESCRIPTION OF THE DRAWINGS

FIG. 10 is a characteristic chart showing the "execution speed $\omega r$" vs. "allowable value $\omega s'$ of slip speed $\omega s$" recorded in CPU in the second embodiment shown in FIG. 7;

DETAILED DESCRIPTION OF THE PEFERRED EMBODIMENTS

The acceleration/deceleration control apparatus using slip speed according to the present invention will be explained with reference to the embodiments according to the present invention.

Figure 1:
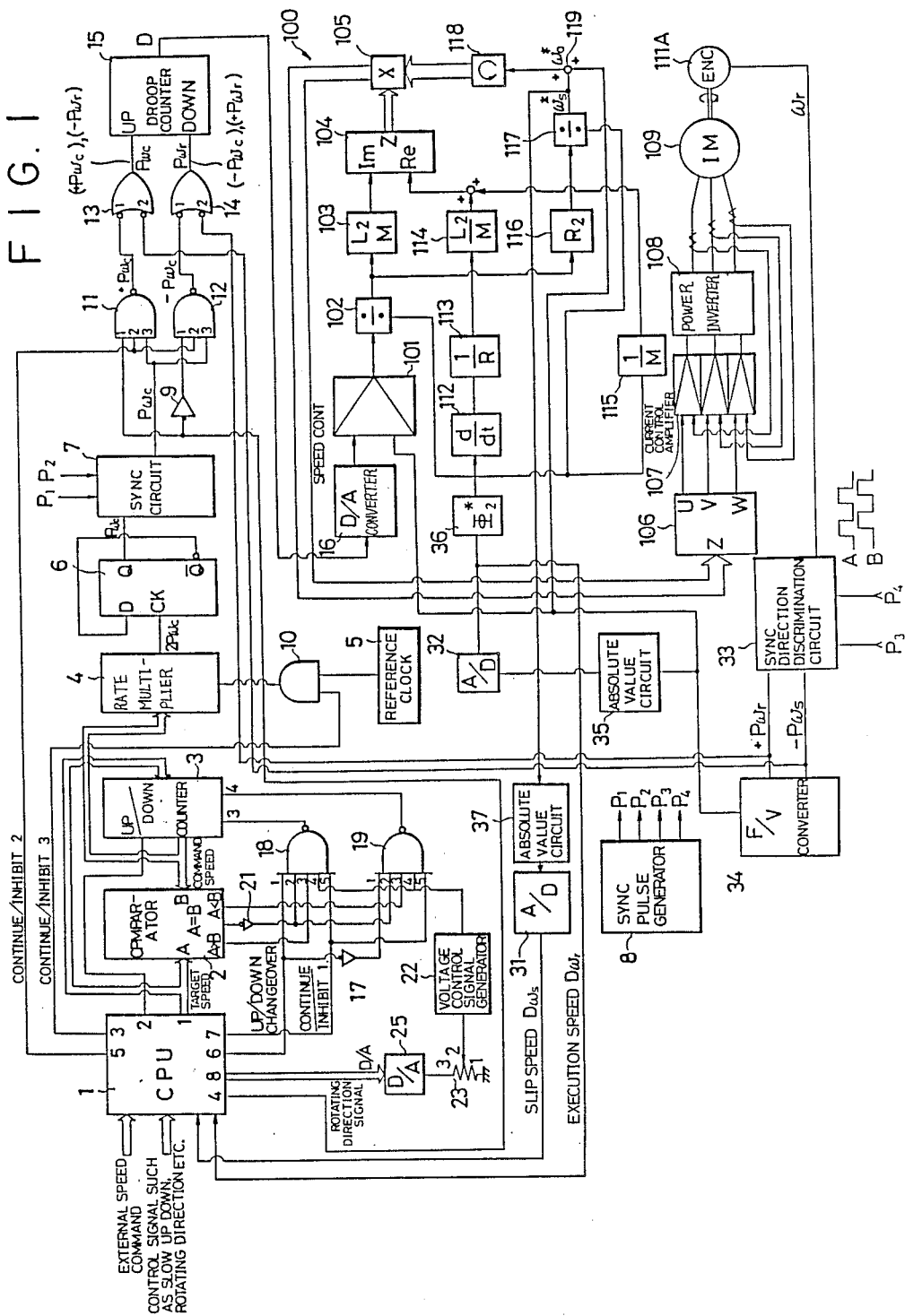
FIG. 1 is a electric circuit diagram of a first embodiment of the acceleration/deceleration control apparatus using slip speed according to the present invention.
Figure 11:
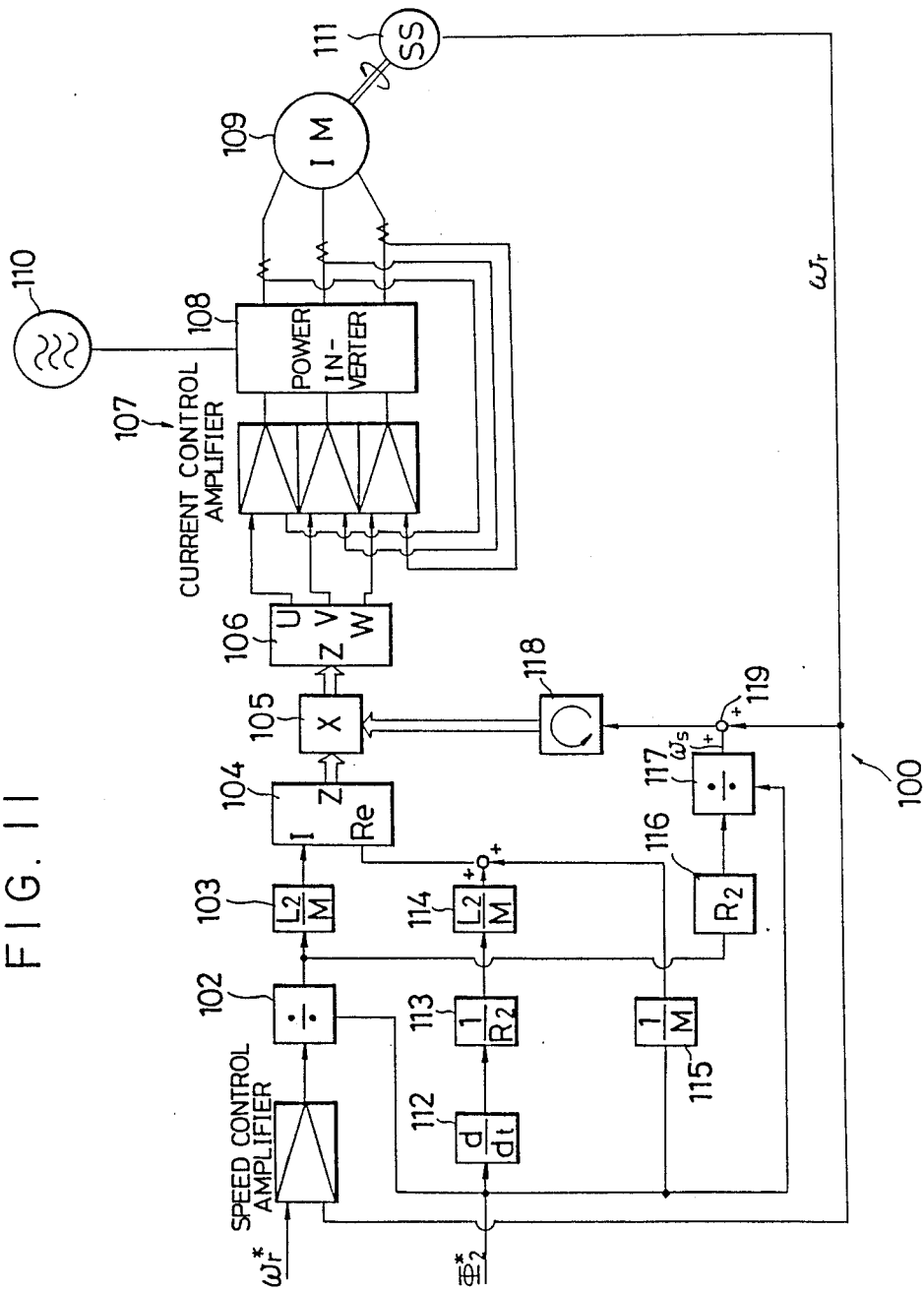
FIG. 11 is a basic concept of the slip-frequency type vector control.

FIG. 1 shows a circuit diagram showing the first embodiment of the acceleration/deceleration control apparatus using slip speed according to the present invention. It should be noted here that the elements in the basic concept of the conventional slip-frequency type vector controller 100 having been described with reference to FIG. 11 will not be again explained here and will be just shown as referred to with reference numerals.

As shown, the central processing unit (which will be referred to as "CPU" hereafter) 1 consisting of a microcomputer, etc. is supplied with a speed command for the IM from an external unit such as the main unit of an NC machine in which the IM is installed which is controlled by the acceleration/deceleration control apparatus according to the present invention. The speed command includes the speed of the IM, for example, 1000 rpm. Further, the CPU 1 is supplied at the input terminal with, as control signals, a slow UP/DOWN signal which can designate whether the rotating speed of the IM should be slowly increased/decreased or not, and a signal which can designate whether the IM should be caused to rotate forward or reversely.

Further the CPU receives from an A/D converter 31 a "slip speed in the form of a parallel signal" D$\omega$s (corresponding to the angular frequency $\omega$r) calculated from an actual angular frequency (which will be referred to as "execution speed" hereafter) $\omega$r obtained from a pulse encoder 111A which detects the output shaft speed of the IM and also from an A/D converter 32 an "execution speed in the form of a parallel signal" D$\omega$r (corresponding to the angular frequency $\omega$r) correspondingly to the above-mentioned execution speed $\omega$r.

The first output port of the CPU is connected to the A input port of a comparator 2 which is provided to detect the acceleration zone or deceleration zone, and the output is also connected to the first input terminal of an up/down counter 3 which provides an equal-step acceleration.

The aforementioned up/down counter 3 has its output connected to the B input port of the comparator 2. Further, the output port of the up/down counter 3 is connected to the input terminal of a rate multiplier 4 which can convert a reference frequency from which a reference lock 5 is generated, into a frequency corresponding to a commanded speed to the IM. The other input of the rate multiplier 4 is connected by means of an AND gate 10 the output terminal of the reference clock 5 which has a frequency of, for example, 4 MHz. It should be noted that the other input of AND gate 10 is connected to the third output terminal of the CPU 1, to provide a signal, as a third means, to designate whether the control having so far been made over the IM is continued or inhibited as will be described later.

The output terminal of the above-mentioned rate multiplier 4 is connected to the input terminal of a sync circuit 7 which provides timing for normal operation of a droop counter 15 which will be described later, after the duty ratio is improved by a flip-flop 6 of, for example, D type (will be referred to as "FF" hereafter). The sync pulse generator circuit 8 is separately illustrated. Note that the pulses P1 and P2 applied to the sync circuit 7 are pulses P1 and P2 used to prevent any "overlapping" with output signal ($\pm$P$\omega$r) from a sync direction discrimination circuit 33 which will be described later.

The above-mentioned CPU 1 delivers at the fourth terminal thereof a rotating direction signal which designates the rotating direction of the IM, and this fourth terminal is connected to an inverter 9 and the first input terminal of a first 3-input NAND gate 11. The output of inverter 9 is connected to the first input terminal of a second 3-input NAND gate 12. The third input terminal of the second 3-input NAND gate 12 is connected to the third input terminal of the first NAND gate 11 and also to the output terminal of said sync circuit 7. It should be noted that there is delivered at the output terminals of the NAND gates 11 and 12 a first pulse train $\pm$P$\omega$c (serial pulse) which designates a change of a rotating shaft position indicated by a second pulse train $\pm$P$\omega$r of the IM which will be described later.

Moreover, the second input terminal of the 3-input NAND gate 12 is connected to the second input terminal of the 3-input NAND gate 11 and also to the fifth output terminal of the CPU 1 at which a signal is delivered as a second means to designate whether the control so far made on the IM is continued or inhibited as will be described later. The output terminals of the NAND gates 11 and 12 are connected to the first input terminals, respectively, of OR gates 13 and 14 which are of negative logic.

The output terminals of the above-mentioned OR gates 13 and 14 are connected to the input terminal of a droop counter 15. The use of the droop counter for positional control, in accordance with the present invention, assures highly accurate rotary speed control that maintains the control gain unchanged over the entire unsaturated region of controlled energy supplied from an inverter to the induction motor, the position control being based upon well-known automatic control theory.

It should be noted that this droop counter 15 is an ordinary up/down counter. This droop counter 15 provided to detect a difference between a commanded position (corresponding to an accumulation of the first pulse train +P$\omega$c or - P$\omega$c) and actual position (corresponding to an accumulation of the second pulse train +P$\omega$r or - P$\omega$r) of the rotor of the IM. The difference is a "positional delay" of the rotor which is used as a speed command designating the speed of the induction motor IM.

The aforementioned droop counter 15 has its output terminal connected to a digital/analogue converter 16 (which will be referred to as "D/A" converter hereafter) whose output is connected to the input terminal of a speed control amplifier 101 (SPEED CONT in FIG. 1) comprising the vector controller 100, the speed control amplifier 101 being so arranged as to receive the above-mentioned "positional delay" as an analogue value.

There is delivered at the sixth output terminal of the CPU 1 an UP/DOWN signal which designates slow UP or DOWN of the IM speed, this sixth output terminal being connected to an inverter 17 and the first input terminal of a first 5-input NAND gate 18. The output terminal of the inverter 17 is connected to the first input terminal of a second 5-input NAND gate 19. The outputs of these first and second 5-input NAND gates 18 and 19 are connected to the third and fourth input terminals, respectively, of the above-mentioned up/down counter 3.

There is delivered at the seventh output terminal of the CPU 1 a signal as the first means to designate whether the control so far made on the IM is continued or inhibited, the seventh output terminal being connected to the fifth input terminals, respectively, of the above-mentioned 5-input NAND gates 18 and 19.

The comparator 2 has its A>B terminal connected to the third input terminal of the aforementioned 5-input NAND gate 18 while the A=B terminal thereof is connected by means of an inverter 21 to the second input terminals, respectively, of the 5-input NAND gates 18 and 19. Furthermore, the A<B terminal of the comparator 2 is connected to the third input terminal of the second 5-input NAND gate 19.

The eighth output port of the CPU 1 is connected to one of the terminals of a variable resistor 23 by means of a digital/analogue converter 25 (which will be referred to as "D/A converter" hereafter), and the other terminal of the variable resistor 23 is connected the ground. The variable terminal of the variable resistor 23 is connected to the input terminal of a voltage control signal generator 22 which produces a frequency proportional to the input voltage, the output terminal thereof being connected to the fourth input terminals of the above-mentioned 5-input NAND gates 18 and 19, respectively.

On the other hand, there is delivered at the output terminal of the aforementioned pulse encoder 111A. 2-phase pulse signals (which correspond to a change of an actual position of a rotor shaft and are indicated with symbols A and B in the lower portion of FIG. 1) of which the phase is shifted 90 degrees as excution speed $\omega r$. These 2-phase pulse signals are supplied to the input terminal of a sync direction discrimination circuit 33 where they provide a discrimination of the direction of IM rotation, sent as a serial pulse $\pm P\omega r$ indicative of the change of a real position of the rotor shaft of IM to a frequency/voltage converter 34 (which will be referred to as "F/V converter" hereafter) and also connected to the second input terminals, respectively, of the negative-logic OR gates 13 and 14. Note that the above-mentioned $+P\omega r$ signal is a signal when the IM rotates forward and the $-P\omega r$ signal is a signal when the IM rotates reversely.

The above-mentioned discrimination circuit 33 receives at its input terminals the pulses P3 and P4 output from the sync pulse generator circuit 8, by which the "change of the real position $P\omega r$ in the form of a serial pulse" will not overlap "change of commanded position $P\omega c$ having been made serial pulse".

The output terminal of said F/V converter 34 is connected by means of an absolute value circuit 35 to an A/D converter 32 of which the output terminal is connected to a secondary magnetic flux generator 36 in which data have previously been stored to excite the IM. Also the F/V converter 34 has its output terminal connected to the second input terminal of the speed control amplifier 101 and also to the adder 119. That is to say, the output from the F/V converter 34 and the output ($\omega s^*$) from the divider 117 are added together in the adder 119 to determine the speed $\omega o^*$ of secondary magnetic flux, which is applied to the vector generator 118.

It should be noted that the signals to designate whether the control so far made on the IM is continued or inhibited include the first to third means as described in the foregoing but these means may not be used at the same time.

In case, for example, the first means is used, it is not necessary to deliver the control signal at the third and fifth output terminals of the CPU 1. In this case, the signal at the seventh output terminal of the CPU 1 may be used to control the outputs of the 5-input NAND gates 18 and 19.

Also, in case the second means is used, the signal at the fifth output terminal of the CPU 1 may be used to control the outputs of the 3-input NAND gates 11 and 12.

Furthermore, in case the third means is used, the signal at the third output terminal of the CPU 1 may be used to control the output of the 2-input NAND gate 10.

Here the operation of the acceleration/deceleration control apparatus using slip speed which is arranged as having been described in the foregoing will be described with reference to the flow charts shown in FIGS. 2 and 3 and the time chart in FIG. 4.

Figure 2:
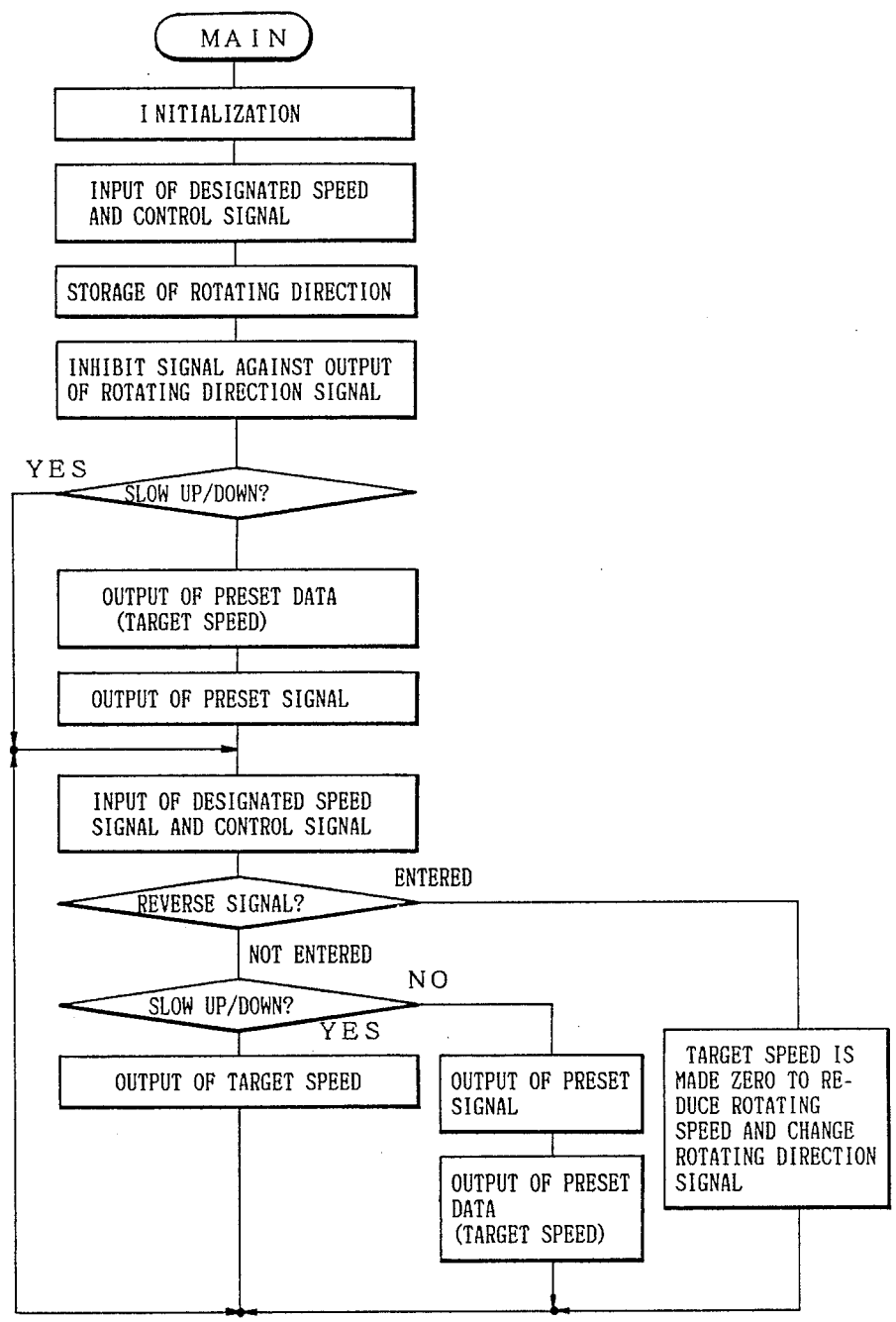
FIG. 2 is a main flow chart of the operations of the acceleration/deceleration control apparatus shown in FIG. 1.

The flow chart shown in FIG. 2 is the main flow chart in which the whole operation of the acceleration/deceleration control apparatus is shown. Namely, the rotation of the IM is controlled by preventing any excessively abrupt acceleration/deceleration based on the speed command, designations such as rotating direction, slow UP/DOWN, etc. from the external unit. The flow chart shown in FIG. 3 is a flow chart of "interval timer interrupt" derived from the main flow chart of FIG. 2, in which an interrupt is employed at predetermined intervals to check the IM for preventing it from stalling.

The prevention of said IM from stalling will be described with reference to FIG. 6. Generally, the relation between the slip speed and torque of the induction motor is such that when the slip is null, the torque is also null and that as the slip increases gradually, the torque increases abruptly. Assume here that the slip when the torque reaches the maximum value Tm is Sm. As the slip increases further from the value Sm, the torque will decrease gradually.

The IM speed can be controlled in a range from the point of zero slip up to a point of the slip reaching the maximum value Sm. Namely, the actual controllable range is limited to a narrow one from zero slip. When the slip exceeds the maximum value Sm, the IM speed cannot be controlled. The operation to keep the IM from such speed-uncontrollable condition is called "prevention of IM from stalling".

First, the operation of raising the IM speed up to a designated speed (for example, 1000 rpm) will be described herebelow:

Assume that 1000 rpm as the speed command, forward rotation command as rotating direction command and slow UP/DOWN signal are provided from the external unit.

In this case, a signal corresponding to the target speed of 1000 rpm is sent from the CPU 1 to the comparator 2, and at the same time, an operation start command signal is sent from the second output terminal of the CPU 1 to the up/down counter 3. Further, a forward rotation signal at H level is applied from the fourth output terminal of the CPU 1 to the first input terminal of the 3-input NAND gate 11, while an H-level signal is applied from the sixth output terminal of the CPU 1 to the first input terminal of the 5-input NAND gate 18.

Also, an H-level signal as "continue" signal is applied from the seventh output terminal of the CPU 1 to the fifth input terminal of the 5-input NAND gate 18, while a D/A data is applied as a signal determining a gradient of slow UP/DOWN from the eighth terminal of the CPU 1 to the D/A converter 25.

A slow UP/DOWN controlled command speed ωc, the output of up/down counter 3, (stepwise commanded speed for gradual approach to the target speed) is applied to the B port of the comparator 2. Then, the "target speed" applied to the A input port of the comparator 2 and the "slow UP/DOWN controlled command speed ωc" given to the B input port are compared with each other in the comparator 2, and in this case, it is judged that A is in the comparator 2, and in this case, it is judged that A is larger than B since the IM has not yet reached the target speed. Therefore, an H-level signal is applied from the A>B terminal of the comparator 2 to the third input terminal of the 5-input NAND gate 18. At this time, an L-level signal is delivered from the A=B terminal of the comparator 2 and inverted by the inverter 21 to an H-level signal which is applied to the second terminal of the 5-input NAND gate 18.

Since the input signals to the first, second, third and fifth terminals of the 5-input NAND gate 18 are all at the H level, the gate is opened so that the pulse from the voltage control amplifier 22 is supplied as the output signal from the 5-input NAND gate 18 as it is to the UP terminal of the up/down counter 3.

Figure 4:
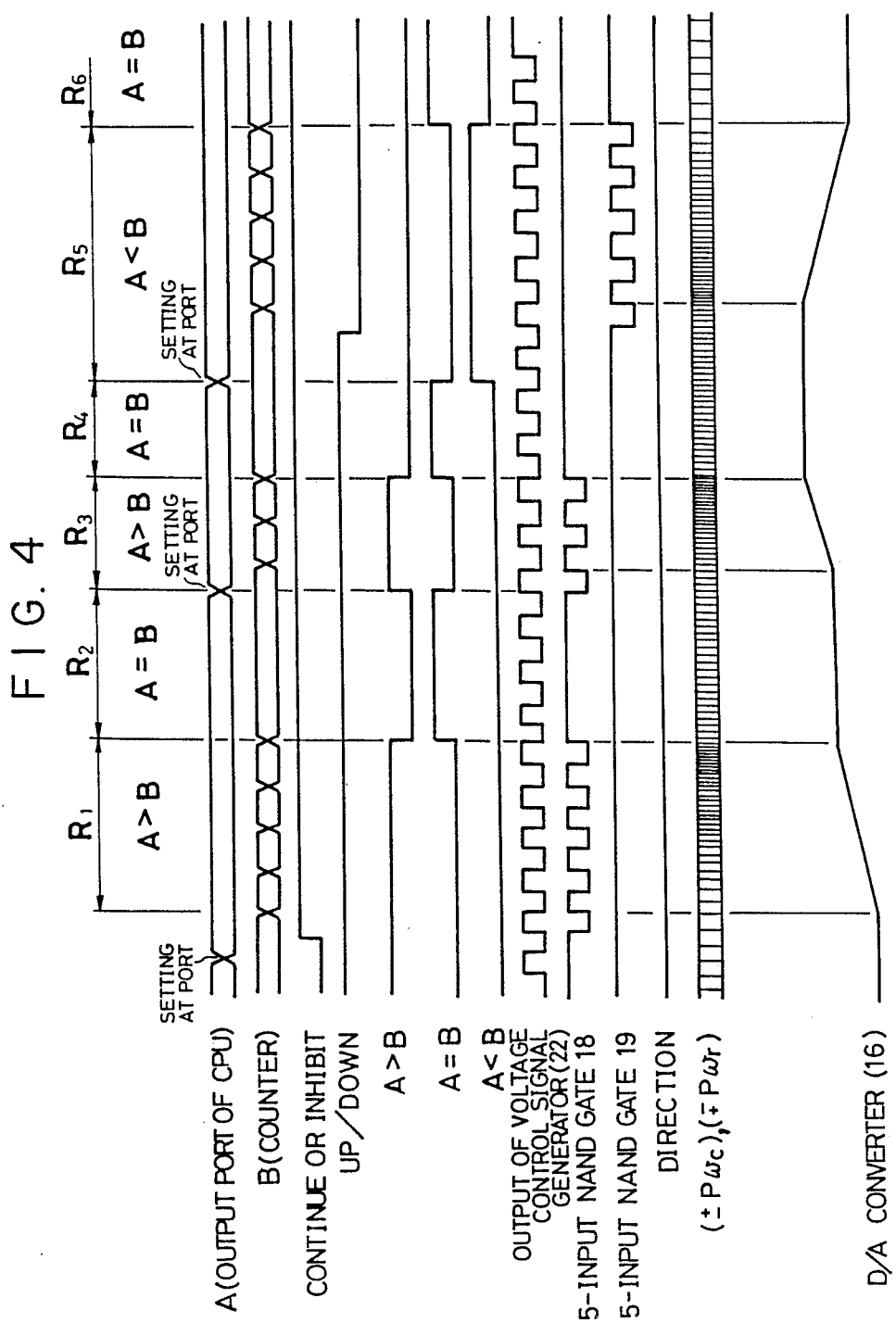
FIG. 4 is a time chart of the electrical circuit diagram of the acceleration/deceleration control apparatus shown in FIG. 1.

More particularly, the above-mentioned conditions corresponds to the "R1 zone shown in FIG. 4."

Figure 5:
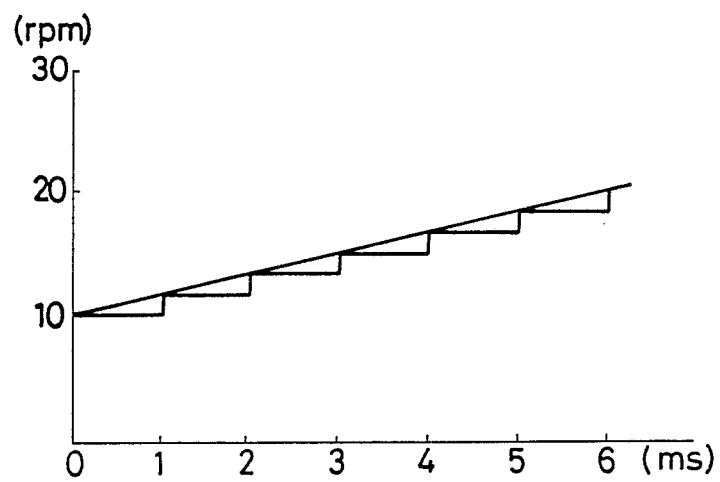
FIG. 5 is an explanatory drawing illustrating the principle of the voltage control signal generator shown in FIG. 1.

In the "R1 zone" the equal-step acceleration is done so that the slow UP/DOWN speed is stepwisely increased in the up/down counter 3 (see FIG. 5). A stepwise speed increase signal is delivered from the output B port of the up/down counter 3 to the rate multiplier 4. It is converted in this rate multiplier 4 into a signal of double frequency Pωc (slow UP/DOWN commanded speed in the form of a serial signal) which is applied to the D-FF 6 which provides a signal of frequency Pωc to the sync circuit 7 where it will be synchronized by the external frequencies P1 and P2 to provide a signal of frequency Pωc which is applied to the third terminals, respectively, of the 3-input NAND gates 11 and 12.

At this time, the 3-input NAND gates 11 and 12 have been supplied at the second input terminals thereof with H-level signal from CPU 1 beforehand, so that only the NAND gate 11 has been opened. Thus, the signal of the above-mentioned frequency Pωc is delivered from only the 3-input NAND gate 11 to the OR gate 13.

Then the Pωc is sent from the OR gate 13 to the droop counter 15. Also, the Pωr is sent from the OR gate 14 to the droop counter 15. The output from this droop counter 15 is sent to the vector controller 100 to provide a vector control. As the result of this vector control, the Pωr approximates Pωc. Namely, the execution speed ωr approximates the command speed ωc. Since the command speed ωc increases gradually and approximates the target value, the execution speed ωr also increases gradually following the increase of the execution speed and finally reaches the target speed.

On the contrary, the output from the A/D converter 32 is supplied as an input to the aforementioned CPU 1 as "a digitalized execution speed Dωr". Also, F/V converted "execution speed in the form of a serial signal" Pωr is applied from the secondary magnetic flux generator 36 to the differentiation circuit 112 of vector controller 100 by means of the absolute value circuit 35 and the A/D converter 32. A slip speed ωs* is calculated according to the principle of vector control where the SPEED CONT 101 receives Pωr through the F/V converter 34 and ωγ* through the D/A converter 16 from the DROOP COUNTER 15, and the flux generator Φ2* 36 receives Pωr through the F/V converter 34, ABSOLUTE VALUE CIRCUIT 35 and A/D 32. This speed is delivered from the ABSOLUTE VALUE CIRCUIT 37 and A/D 31, which constitute slip feedback means, to the CPU1, as a digitalized slip speed Dωs "a digitalized slip speed".

Thus, the speed of the IM 109 is gradually increased and when the target value (1000 rpm) is finally equal to the execution speed ωr, the inputs to the A port and B port of the comparator 2 are equal to each other as shown in the R2 zone in FIG. 4.

Then, since an H-level signal is delivered from the A=B terminal of the comparator 2, the above-mentioned 5-input NAND gate 18 is supplied at the second terminal thereof with an L-level signal and also an L-level signal is supplied to the second terminal of the 5-input NAND gate 19.

That is, in this case, both the NAND gates 18 and 19 are closed so that the output from the voltage control amplifier 22 will not be applied to the up/down counter 3. In this case, the command speed output ωc from the up/down counter 3 becomes a predetermined value and also the execution speed ωr becomes a predetermined value. Thus, in the vector controller 100, a control is made to keep the IM 109 at a predetermined speed.

In case the speed is lowered with the target speed being smaller than the execution speed ωr, an H-level signal is delivered from the A<B terminal of the comparator 2. At this time, an L-level signal is supplied from the sixth terminal of the CPU 1 and also an H-level signal is supplied to the first terminal. Furthermore, an H-level signal is also supplied from the seventh terminal of the CPU 1 to the fifth terminal of the 5-input NAND gate 19, so that the NAND gate 19 will supply the output pulse from the voltage control signal generator 22 to the DOWN terminal of the up/down counter 3.

In this case, the condition corresponds to the "R5 zone" shown in FIG. 4 where the execution speed ωr of the IM 109 is lowered. The slowed down command speed ωc delivered from the up/down counter 3 is sent as Pωc from the OR gate 13 through the rate multiplier 4 and sync circuit 7 to the droop counter 15. Also Pωc is delivered from the OR gate 14 to the droop counter 15. The output from the droop counter 15 is sent to the vector controller 100 to provide a vector control. As the result of this vector control, Pωr is reduced and approximates Pωc. Namely, the execution speed ωr is decreased and approximates the slowed down command speed ωc. Since the command speed gradually decreases and approximates the target speed, the execution speed ωr also gradually decreases following the gradual decrease of the command speed ωc and will finally reach the target speed. Thus, the general increase and decrease of the speed of IM 109 are controlled.

Figure 3:
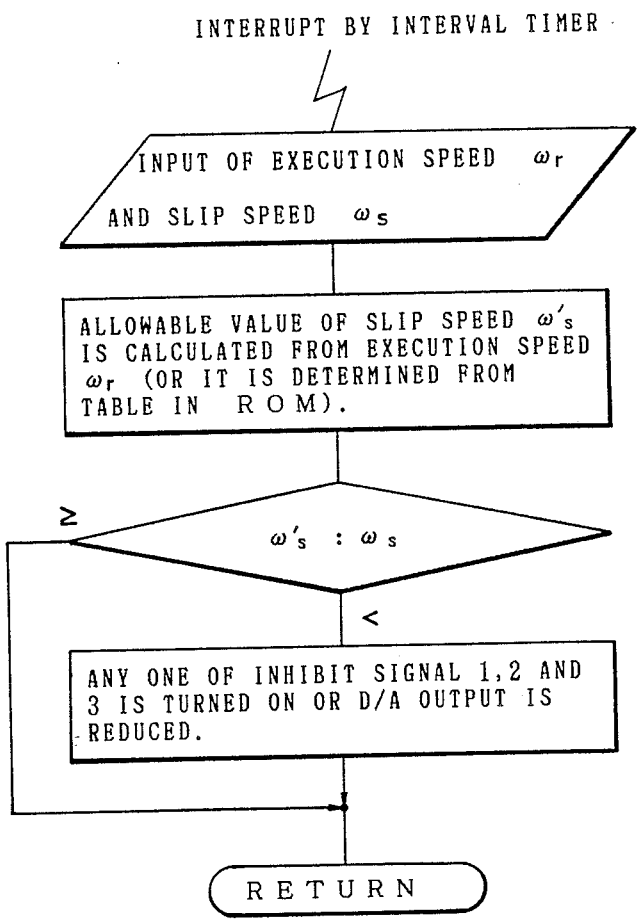
FIG. 3 is a flow chart of interval timer interrupt in the main flow chart of FIG. 2.

Also, the "interval timer interrupt" shown in FIG. 3 is effected at predetermined intervals for the above-mentioned prevention of IM from stalling.

In the CPU 1 there is stored a formula for calculating from the execution speed ωr an "allowable value ωs' of an angular frequency ωs corresponding to slip speed", and the allowable value ωs' and angular frequency ωs are compared at predetermined intervals.

As the result of this comparison, if "the allowable value ωs' is equal to or larger than the angular frequency ωs", the IM is not likely to stall. In this case, the control having so far been made over the IM is continued. If "the allowable value ωs' is smaller than the angular frequency ωs", the IM is controlled for the angular frequency ωs to be smaller than the allowable value ωs'. The means for this control include the first to third inhibiting means or a means to inhibit the D/A data delivered from the eighth terminal of the CPU 1.

The inhibition of the slip angular frequency ωs to be lower than the allowable value ωs' needs only the control of the command speed ωc for low acceleration or deceleration. For this purpose, it is necessary to increase or decrease the command speed ωc slowly. The above-mentioned first to third inhibiting means and the inhibition of the output of D/A converter 25 are destined for inhibiting the increase or decrease of the command speed ωc. Owing to this inhibition, the increase or decrease of the value of the output Pwc of the OR gate 13 is also small. As the result, the output D from the droop counter 15 is delivered to the vector control circuit to control the IM speed. At this time, the angular frequency of the rotating magnetic field of the IM changes slowly so that the IM is accelerated or decelerated slowly. If this acceleration or deceleration of the IM is slow, the slip angular frequency ωs becomes low and finally less than the allowable value ωs'. Thus, it will not enter the zone where the IM is stalled.

By effecting the above-mentioned control, it is possible to prevent the IM from being accelerated or decelerated with any excessive abruptness and from stalling, which assures a stable rotation of the IM.

Figure 7:
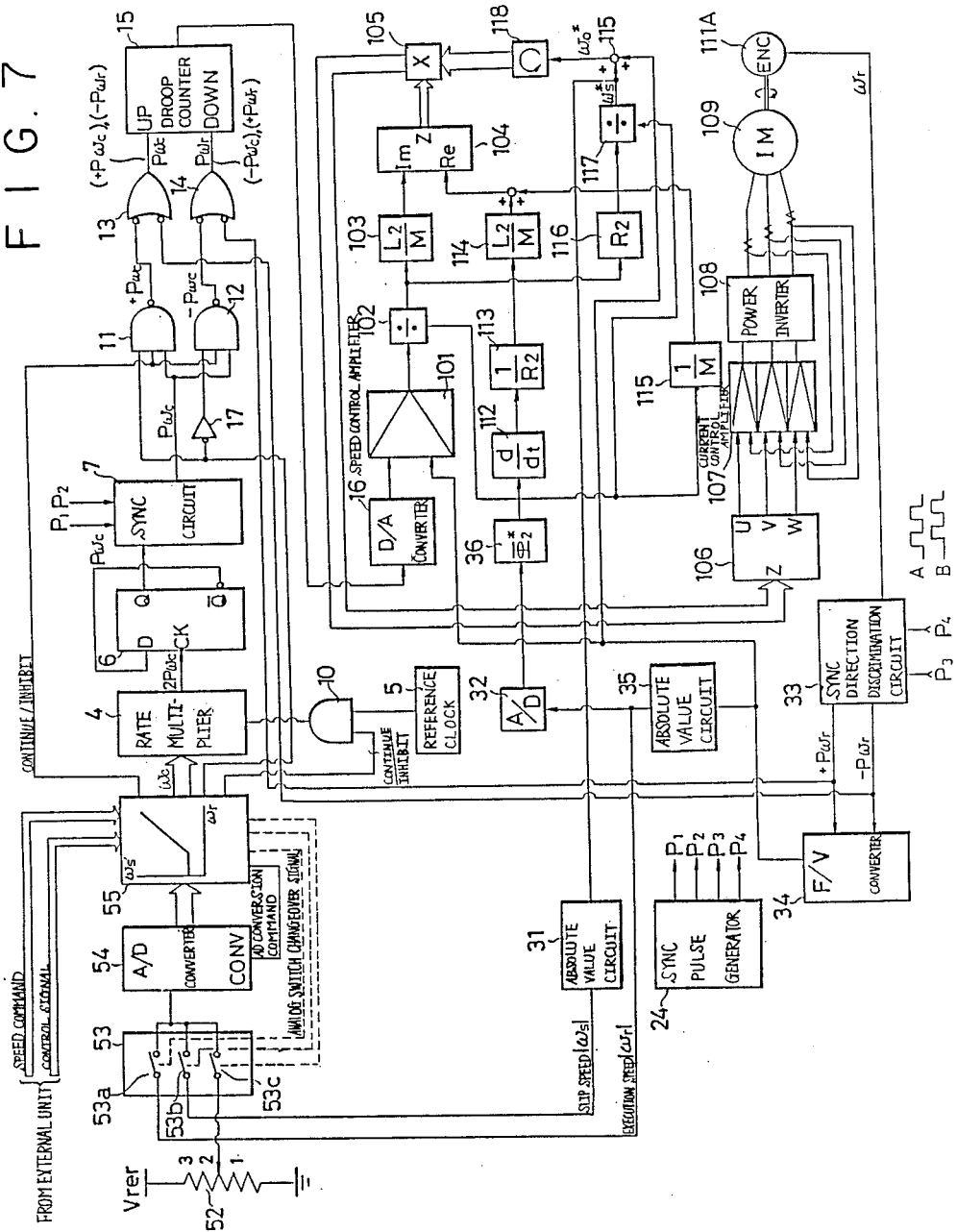
FIG. 7 is an electric circuit diagram a second embodiment of the acceleration/deceleration control apparatus using slip speed according to the present invention.

Next, the second embodiment of the present invention will be described with reference to FIGS. 7 to 10. The configuration of this second embodiment is illustrated in FIG. 7, but the elements having been already explained in connection with the first embodiment will be shown just with their respective reference numerals and will not be explained again herebelow.

The execution speed $|\omega r|$ is supplied to a switch 53a of a switching circuit 53 consisting of, for example, analogue switches. Also the slip speed $|\omega s|$ is supplied to the switch 53b of the switching circuit 53. Further, the switch 53c of the switching circuit 53 is connected to the second terminal of the variable resistor 52 of which the third terminal is connected to the reference voltage Vref. The output terminals of the switches 53a, 53b and 53c of the switching circuit 53 are connected to one another and also to the input terminal of the A/D converter 54.

The above-mentioned switching circuit 53 is supplied with a switch on command signal from a CPU 55 which will be described below. Any one of the switches 53a, 53b and 53c is selected and turned on according to the switch on command signal.

The output terminal of the A/D converter 54 is connected to the CPU 55 so that an analogue/digital conversion command is supplied from the CPU 55 to the CONV terminal of the A/D converter 54.

Also the CPU 55 is supplied at the second input port thereof with a speed command from an external unit, and at the third input port thereof with a control signal from the external unit.

The data bus from the output of the CPU 55 is connected to the rate multiplier 4, so that a signal i.e. command speed ωc, processed at the CPU 55 is delivered as data to the rate multiplier 4. Furthermore, the CPU 55 delivers a rotating direction command which designates the rotating direction of the IM, which command is supplied to the first input terminal of the 3-input NAND gate 11 and the first input terminal of the 3-input NAND gate 12 through the inverter 9.

The acceleration/deceleration control apparatus using slip speed according to the second embodiment of the present invention is constructed as described in the foregoing.

First, the prevention of stalling will be explained herebelow. As in the aforementioned first embodiment, for speed control of the IM, it is necessary to control the slip speed ωs to less than a predetermined value (for example, less than Sm as in FIG. 6) by always monitoring the execution speed ωr of the IM. For this purpose, it suffices that the relation of "execution speed ωr" vs. "allowable value ωs' of slip speed ωs" as shown in FIG. 10 is stored in the part of read only memory (ROM) of the CPU 55 to maintain the slip speed according to the relation.

Figure 6:
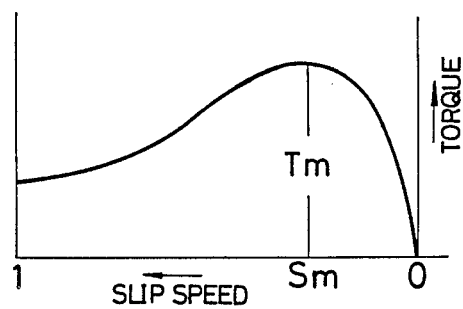
FIG. 6 is a characteristic chart showing the slip speed vs. torque of the induction motor.

That is, for this relation of "execution speed ωr" vs. "allowable value ωs'", a table is prepared in which when the execution speed is, for example, ωr1, the allowable slip speed is always ωs1', and the allowable slip speed ωs1' is so set as to be within the control range of the torque curve shown in FIG. 6.

As shown in FIG. 7, the execution speed $|\omega r|$ and slip speed $|\omega s|$ are sent to the switches 53a and 53b, respectively, of the switching circuit 53, and the output from the switching circuit 53 is subjected to the digital conversion in the A/D converter 54 and supplied to the CPU 55.

Figure 8:
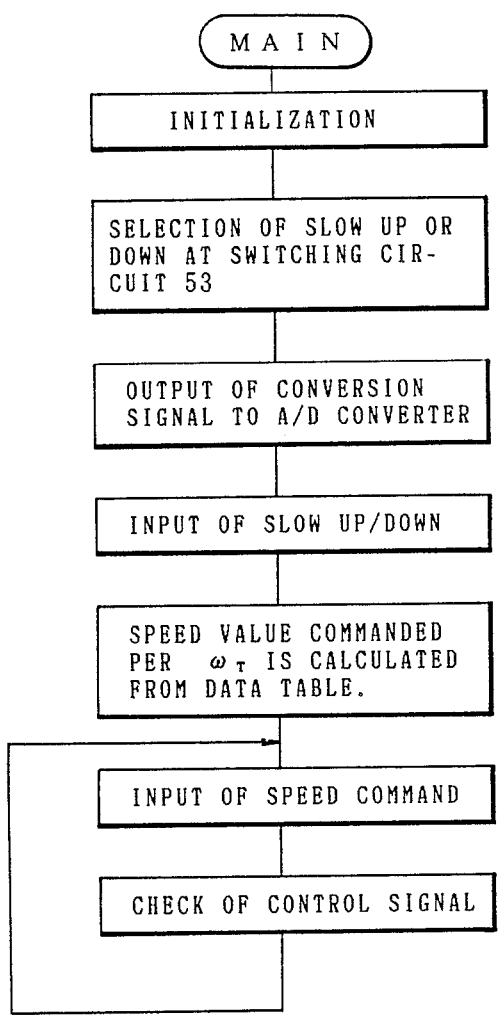
FIG. 8 and 9 show a main flow chart of the acceleration/deceleration control apparatus shown in FIG. 6 and a flow chart of interval timer interrupt, respectively.

In this condition, the slow UP/DOWN control of the command speed ωc is effected according to the main flow chart shown in FIG. 8.

Figure 9:
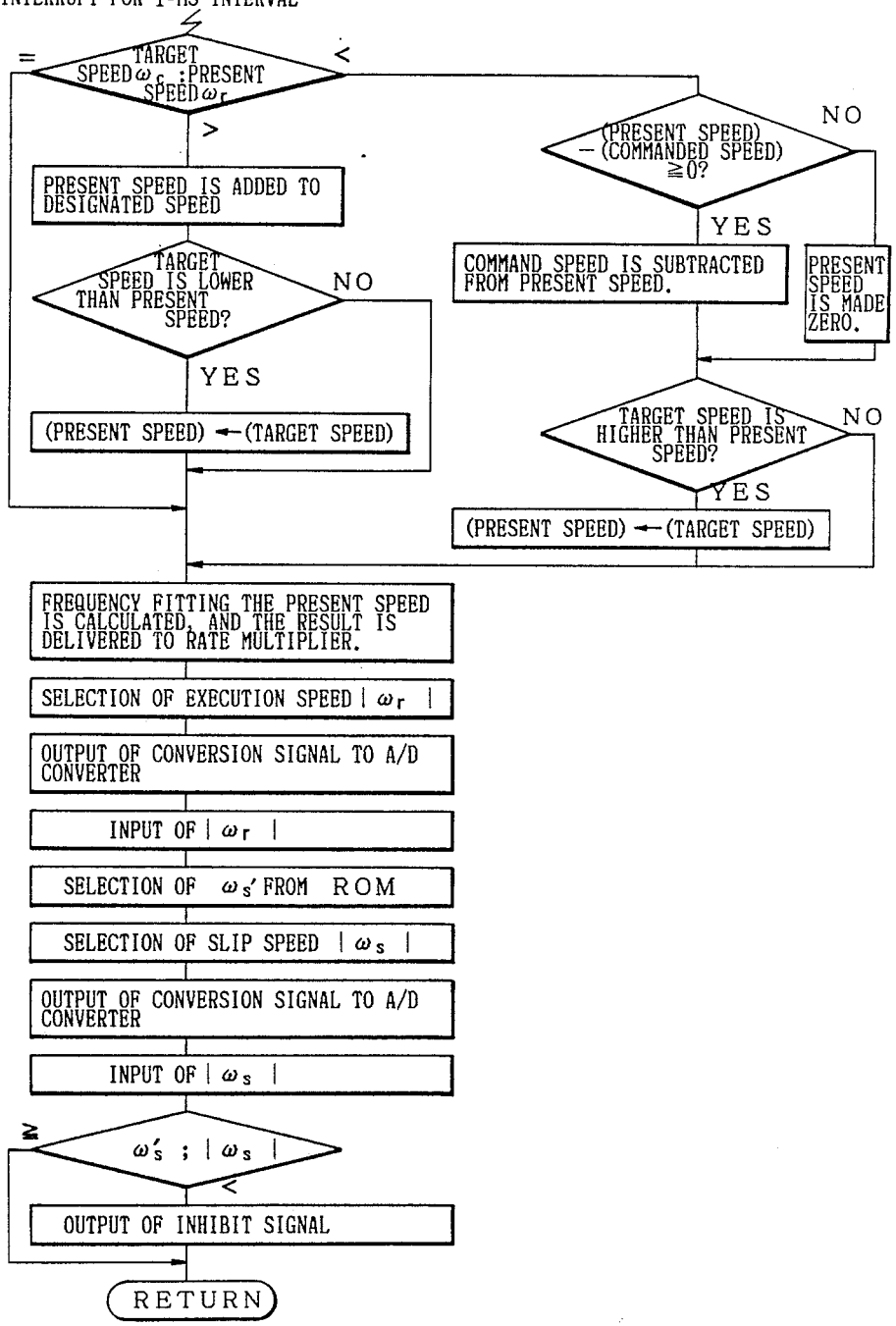

On the other hand, when an interrupt for the prevention of stalling as shown in FIG. 9 occurs, the allowable value ωs' of slip speed ωs corresponding to the execution speed ωr supplied from the A/D converter 54 is read immediately from the table stored in the CPU 55 and which carries the characteristic of "execution speed ωr" va. "allowable value ωs'" as shown in FIG. 10. The allowable value ωs' and the slip speed $|\omega s|$ calculated according to the vector controller are compared with each other. If the result of the comparison is that the "allowable value ωs' is equal to or larger than the angular frequency ωs of slip speed", the control having so far been made is continued. If the result is that "allowable value ωs' is smaller than the angular frequency ωs", the IM is so controlled that the angular frequency ωs becomes less than the allowable value ωs'.

Thus, it is possible to prevent the IM from being accelerated or decelerated excessively abruptly and from stalling.

What is claimed is:

1. An acceleration/deceleration control apparatus for controlling the speed of an induction motor using a slip speed thereof, comprising:
   detector means for detecting an actual speed of the induction motor to provide an actual speed signal ωr corresponding thereto;
   a vector controller for generating a slip speed signal ωs* as a function of a secondary flux registered previously corresponding to said actual speed signal ωr, of said actual speed signal ωr, and of a command speed signal ωr* derived as a result of the control of said apparatus;

slip feedback means connected to said vector controller for feeding back the slip speed signal $\omega s^*$ in the form of the absolute value signal $\omega s$ of said slip speed signal $\omega s^*$;

comparing means connected to said slip feedback means for comparing a predetermined allowable slip speed signal $\omega s'$ corresponding to said actual speed signal $\omega r$ with said slip speed signal $\omega s$;

first means for generating a first pulse train $P\omega c$ for specifying the speed of the induction motor;

responsive means connected to said comparing means and said first means for forcing said first means to continue the generation of said first pulse train $P\omega c$ when the slip speed signal $\omega s$ is equal to or less than said allowable slip speed signal $\omega s'$ as a result of the comparison in said comparing means or forcing the same to moderate the generation of said first pulse train $P\omega c$ when the slip speed signal $\omega s$ is greater than said allowable slip speed signal $\omega s'$ until the slip speed signal $\omega s$ becomes less than the allowable slip speed signal $\omega s'$, whereby the angular frequency of the rotating magnetic field of the induction motor is inhibited from changing excessively, to prevent stalling of the induction motor;

second means connected to said detector means, and to said vector controller and said comparing means for receiving said actual speed signal $\omega r$ detected by said detector means, and for generating both of a second pulse train $P\omega r$ corresponding to said actual speed signal $\omega r$ and of the absolute value of the actual speed signal $\omega r$, and applying the latter to said comparing means and said vector controller;

a droop counter connected to said first means, second means, and vector controller for generating said command speed signal $\omega r^*$ correspondingly to a difference between the accumulation of said first pulse train $P\omega c$ and the accumulation of said second pulse train $P\omega r$, said command speed signal $\omega r^*$ so generated being supplied to said vector controller together with said absolute value of the actual speed signal $\omega r$ from said second means for controlling the torque of the induction motor connected to said vector controller.

2. An acceleration/deceleration control apparatus for controlling the speed of an induction motor using a slip speed thereof according to claim 1, further comprising means for changing the angular frequency of said rotating magnetic field gradually to prevent the generation of any shock on the rotation of the induction motor.

3. An acceleration/deceleration control apparatus using a slip speed thereof according to claim 1, wherein said allowable slip speed signal $\omega s'$ is stored in memory means ROM included in said comparing means to permit said absolute value of the actual rotary speed signal $\omega r$ to address thereto as the address data of itself.

* * * * *